(12) United States Patent
Van Herpen

(10) Patent No.: US 8,851,701 B2
(45) Date of Patent: Oct. 7, 2014

(54) PADDING FOR A CARPET AND CARPET-PADDING COMBINATION

(75) Inventor: Maarten Marinus Johannes Wilhelmus Van Herpen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 316 days.

(21) Appl. No.: 13/132,687

(22) PCT Filed: Dec. 1, 2009

(86) PCT No.: PCT/IB2009/055440
§ 371 (c)(1),
(2), (4) Date: Jun. 3, 2011

(87) PCT Pub. No.: WO2010/064192
PCT Pub. Date: Jun. 10, 2010

(65) Prior Publication Data
US 2011/0242803 A1 Oct. 6, 2011

(30) Foreign Application Priority Data
Dec. 4, 2008 (EP) .................................... 08170727

(51) Int. Cl.
*F21S 8/00* (2006.01)
*D05C 17/02* (2006.01)
*F21V 8/00* (2006.01)
*F21V 33/00* (2006.01)

(52) U.S. Cl.
CPC .............. *D05C 17/023* (2013.01); *G02B 6/001* (2013.01); *F21V 33/006* (2013.01)
USPC ............................ 362/153; 362/253; 362/559

(58) Field of Classification Search
USPC .............. 362/84, 103, 104, 108, 153, 249.02, 362/249.04, 253, 255, 276, 330, 471, 488, 362/543, 545, 565, 566, 559, 800, 806; 340/331, 332, 815.4, 815.45, 815.73; 442/2, 20, 43, 49
See application file for complete search history.

(56) References Cited

U.S. PATENT DOCUMENTS

| | | | | |
|---|---|---|---|---|
| 2,041,909 A | * | 5/1936 | Emmert et al. | 40/427 |
| 2,156,553 A | * | 5/1939 | Vendope | 40/558 |
| 4,177,503 A | * | 12/1979 | Anquetin | 362/236 |
| 4,271,458 A | * | 6/1981 | George, Jr. | 362/236 |
| 4,329,739 A | * | 5/1982 | Loebner | 362/153 |
| 4,340,929 A | * | 7/1982 | Konikoff et al. | 362/153 |
| 4,347,499 A | * | 8/1982 | Burkman et al. | 340/815.69 |
| 4,600,975 A | * | 7/1986 | Roberts | 362/147 |
| 4,737,764 A | | 4/1988 | Harrison | |

(Continued)

FOREIGN PATENT DOCUMENTS

| CN | 1806723 A | 7/2006 |
|---|---|---|
| CN | 101134111 A | 3/2008 |

(Continued)

Primary Examiner — Hargobind S Sawhney
(74) Attorney, Agent, or Firm — Larry Liberchuk

(57) ABSTRACT

The invention provides a padding for a carpet. The padding comprises a first padding face and a tube at least partly integrated in the padding. The tube comprises a transmissive section, transmissive for light having a predetermined wavelength selected from the visible spectrum. A lighting device may be introduced in the tube. The invention further provides a carpet-padding combination and a combination of the tube and a lighting device.

12 Claims, 5 Drawing Sheets

(56) References Cited

U.S. PATENT DOCUMENTS

| | | | |
|---|---|---|---|
| 4,754,372 A | 6/1988 | Harrison | |
| 4,794,373 A | 12/1988 | Harrison | |
| 5,095,412 A * | 3/1992 | French | 362/153 |
| 5,934,792 A * | 8/1999 | Camarota | 362/558 |
| 6,394,623 B1 * | 5/2002 | Tsui | 362/235 |
| 6,481,877 B1 * | 11/2002 | Bello, Jr. | 362/488 |
| 6,491,999 B1 * | 12/2002 | Cawthra et al. | 428/95 |
| 6,565,251 B2 * | 5/2003 | Chen | 362/555 |
| 6,688,754 B1 * | 2/2004 | Wu | 362/249.08 |
| 6,718,576 B1 * | 4/2004 | Shih | 5/417 |
| 6,836,065 B2 * | 12/2004 | Chow | 313/485 |
| 7,220,025 B2 * | 5/2007 | Parker | 362/311.02 |
| 7,347,577 B1 | 3/2008 | Rapisarda | |
| 7,670,026 B1 * | 3/2010 | Hawkins | 362/249.05 |
| 7,918,579 B2 * | 4/2011 | Hamar et al. | 362/153 |
| 2005/0146442 A1 * | 7/2005 | Chen | 340/815.45 |
| 2006/0082987 A1 | 4/2006 | Dorsey | |
| 2007/0037462 A1 | 2/2007 | Allen | |

FOREIGN PATENT DOCUMENTS

| | | |
|---|---|---|
| CN | 201042082 Y | 3/2008 |
| EP | 0259051 A2 | 3/1988 |
| EP | 0261811 A2 | 3/1988 |
| JP | 08004268 A | 1/1996 |
| JP | 2005034611 A | 2/2005 |
| WO | WO2007033980 A2 | 3/2007 |

* cited by examiner

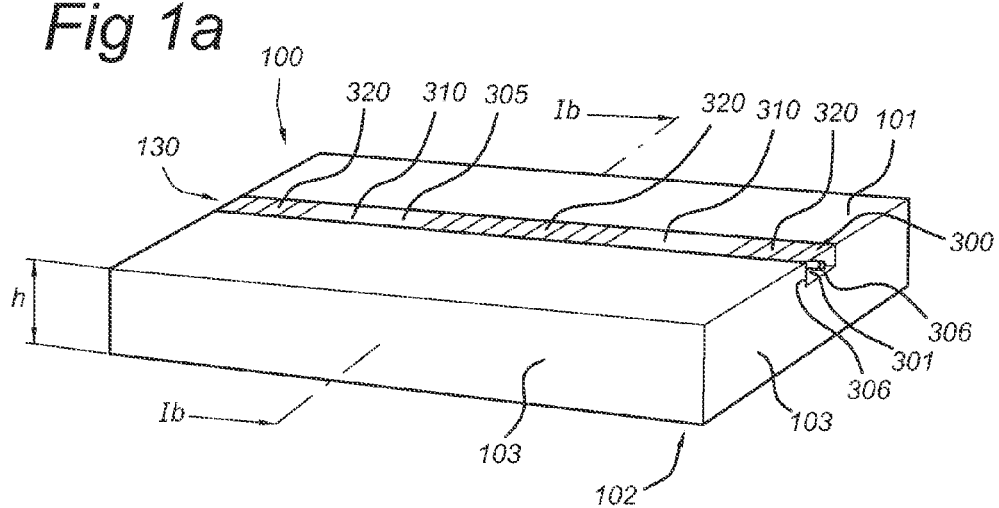
Fig 1a
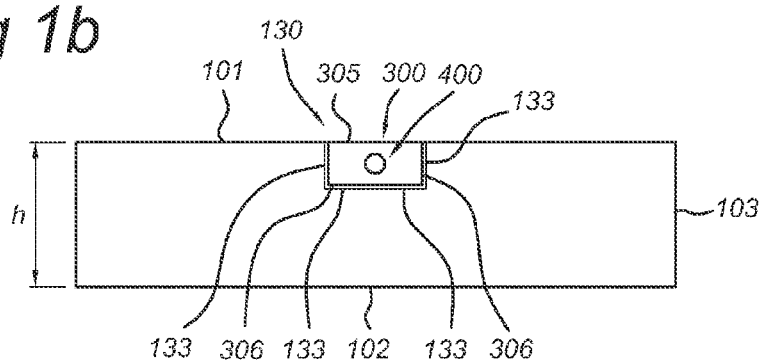
Fig 1b
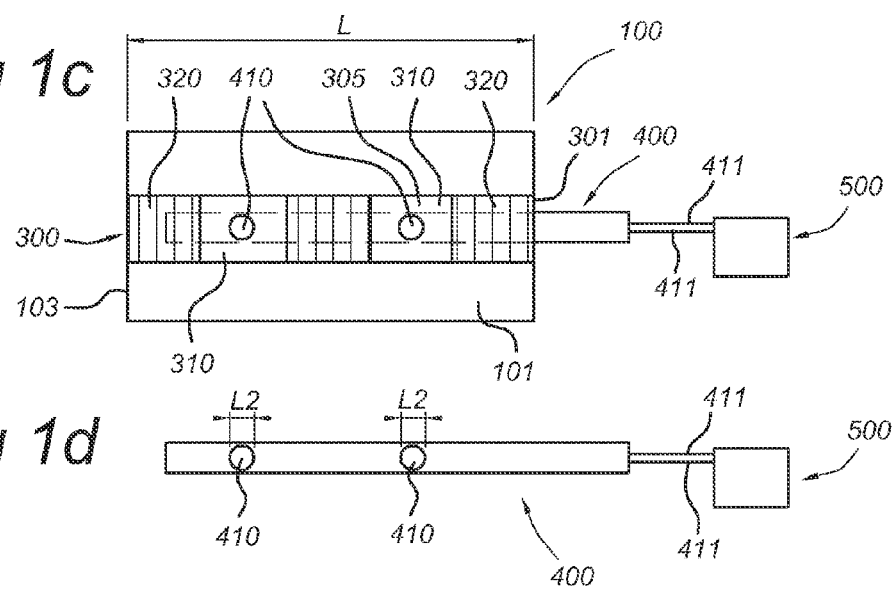
Fig 1c
Fig 1d

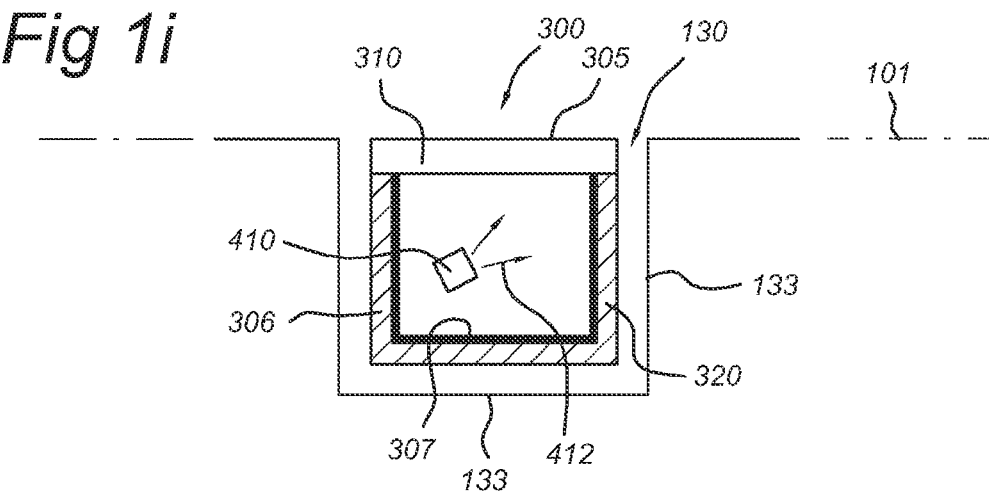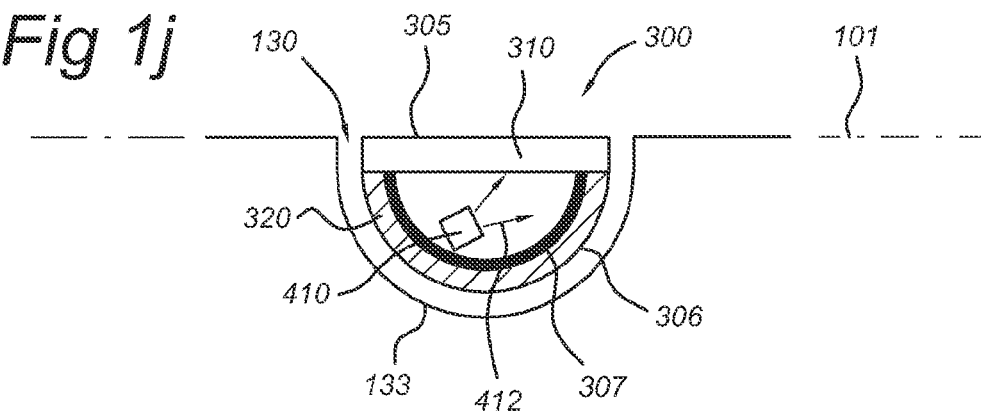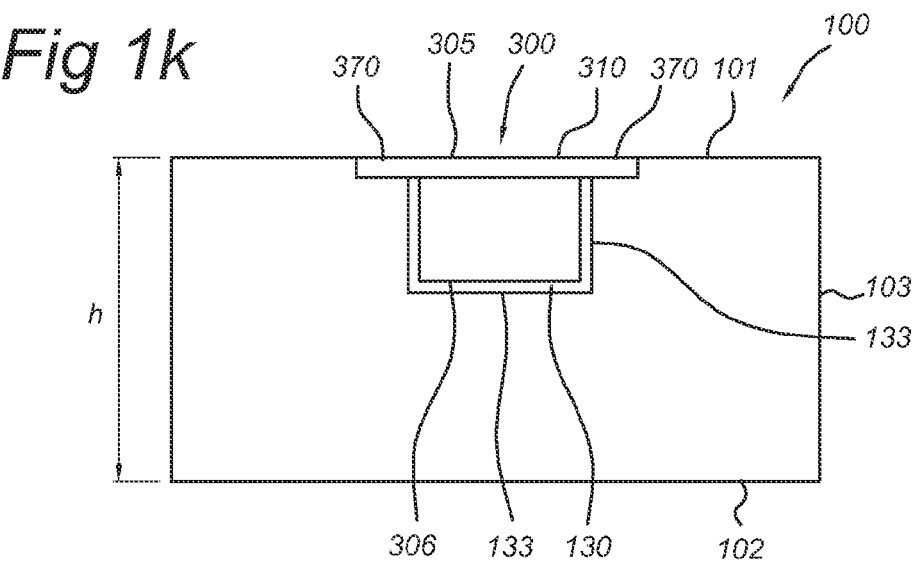

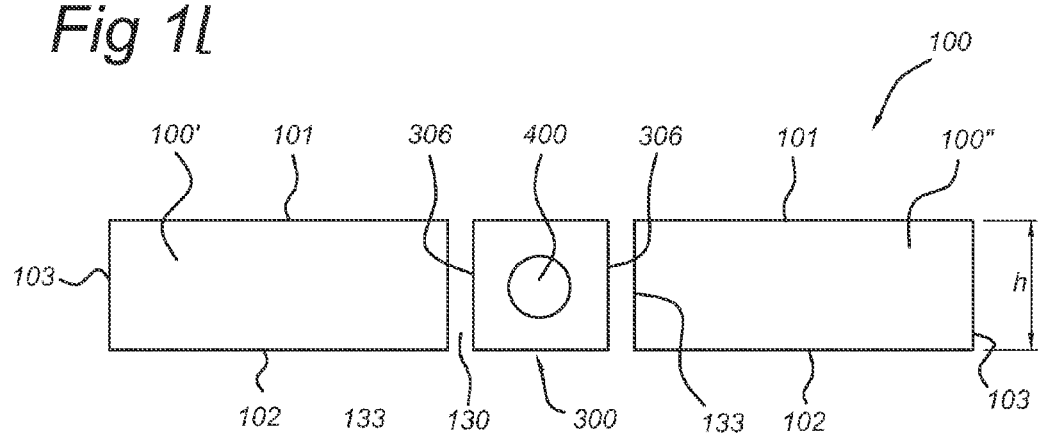
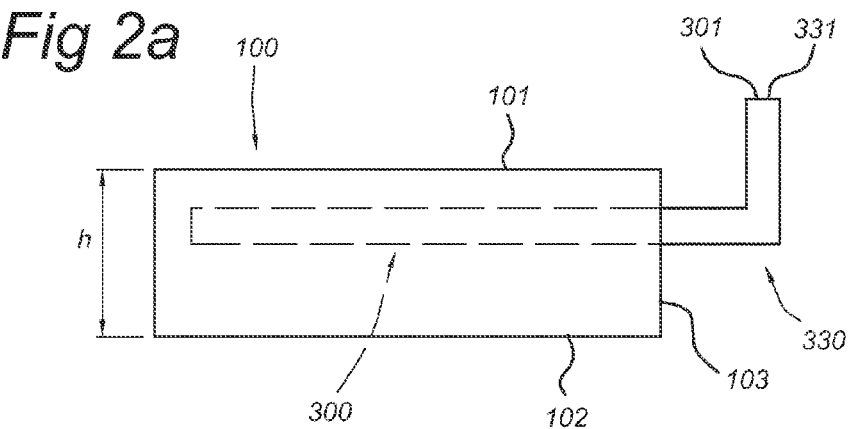
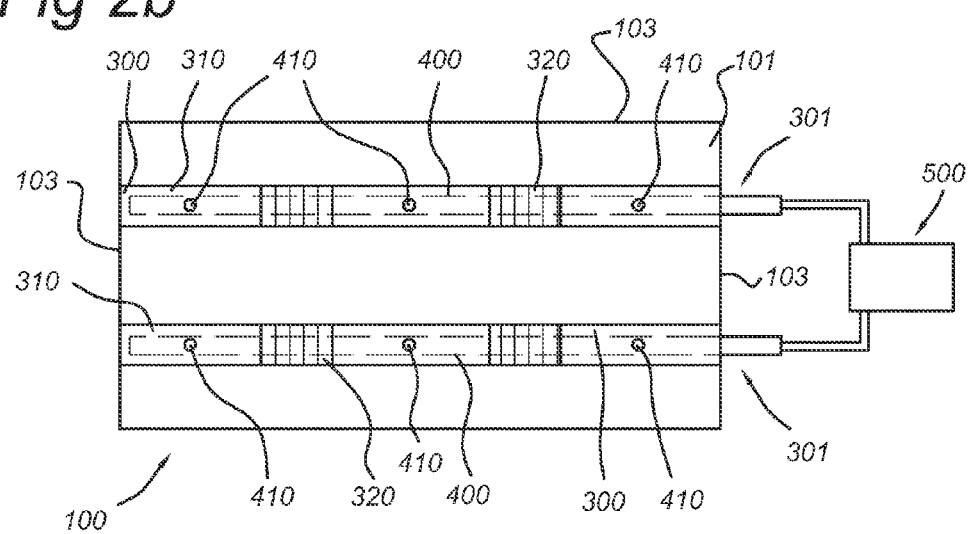

US 8,851,701 B2

PADDING FOR A CARPET AND CARPET-PADDING COMBINATION

FIELD OF THE INVENTION

The invention relates to a padding for a carpet and to a carpet-padding combination as well as a combination of a tube and a lighting device for use in such carpet or carpet-padding combination.

BACKGROUND OF THE INVENTION

Carpets generally comprise a primary backing layer provided with yarns forming tufts (on its side facing the user during its use as carpet), a secondary backing layer, and in general an adhesive layer provided between the primary backing layer and the secondary backing layer. The yarns penetrate the primary backing layer to form tufts projecting from the pile surface on which people can walk, etc. The yarns are normally loose and need to be adhered with adhesive (from an adhesive layer). The adhesive layer which may be present on the backside of the primary backing adheres the tufts to the primary backing layer and holds the tufts in place, as well as adhering the primary backing layer and the secondary backing layer. The latter may also be achieved with a second adhesive layer on top of the first adhesive layer.

Textiles comprising optical fibers are known in the art. US2007/0037462 for instance describes a method for manufacturing a distributed optical fibers scrim comprising functional optical fibers, the functional optical fibers scrim thus manufactured, and composites in which an optical fibers scrim is incorporated. This document describes a variety of textile scrims, particularly adhesively bonded non-woven scrim materials, each comprising at least one optical fiber with a continuous path across at least the length or width of the fabric. Such optical fibers scrims may be useful as sensor components (for example, as a detector of breakage, strain, pressure, or torque), as illumination components (for example, in a variety of light-providing applications), or as data-distribution components, either alone or in combination with other materials, such as fabrics, films, foams, and the like.

The use of electronic components in for instance carpets is known in the art. WO2007033980 for instance describes such carpet, as well as a method for equipping a carpet with electronic components. In order to create a method which ensures that the electronic components can be applied to the carpet in an efficient and accurately locatable manner, the electronic components that are fixedly joined to a support material are glued to the carpet with the aid of the supports.

US 2006082987 describes a lighting device that comprises at least one light emitting diode that is adapted for being electrically connected to a power source, and at least one sheet of fabric for covering the at least one light emitting diode. As such, light emitted from the at least one light emitting diode is able to shine through the at least one sheet of fabric.

U.S. Pat. No. 4,754,372 describes an illuminable covering of a textile material having a fibrous face with at least one lighting source connected to the back of the textile material. A plurality of light-transmissive fibers are connected to the light source and emanate therefrom, with their free end portions terminating adjacent the fibrous face of the textile material for transmitting light thereto when the light source is energized. In an embodiment, the textile material is a floor covering material such as a carpet or rug.

U.S. Pat. No. 4,794,373 describes an apparatus for visually guiding the occupants of a structure in a path of travel along the floor within the structure is provided. This apparatus is comprised of a carpet overlying the floor, and a lighting strip positioned underneath the carpet. The lighting strip comprises an elongate ribbon, with a group of laterally spaced-apart electrical conductors encased in and extending longitudinally of the ribbon of sheet material. A series of light-transmissive plastic housings are connected to and arranged longitudinally along a common outer surface of the ribbon of plastic sheet material. Light-emitting means are positioned within each of the housings, and are electrically connected to predetermined ones of the group of electrical conductors encased in the ribbon of sheet material. The carpet has holes extending therethrough which are arranged in a series corresponding to the series of light-transmissive housings on the lighting strip. The housings are positioned in the holes of the carpet so that when the light-emitting means positioned within the housings are energized, a visually discernible pathway appears along the face of the carpet.

SUMMARY OF THE INVENTION

A disadvantage of the prior art is for instance that for a lighting device that is covered with carpet, it is difficult to replace the lighting device, for example if the lighting device (or an (individual) light source comprised by the lighting device) fails. It is not always possible to install the carpet without the use of adhesives, and in these cases it becomes extra difficult to remove the carpet after installation. Hence, it is an aspect of the invention to provide an alternative padding, and an alternative carpet-padding combination, which preferably further at least partly obviate one or more of above-described drawbacks.

The invention proposes a transparent tube in the carpet padding. The tube has an opening through which a lighting device can be inserted. In this way it is in general relatively easily possible to replace the lighting device.

In a first aspect, the invention provides a padding for a carpet (herein further indicated as "padding" or "carpet padding"), the padding comprising a first padding face and a tube at least partly integrated in the padding, wherein the tube comprises a transmissive section, wherein the transmissive section is transmissive for light having a predetermined wavelength selected from the visible spectrum, and wherein the padding optionally further comprises a lighting device, slidably arranged in the tube.

In a further aspect, the invention provides a carpet-padding combination, comprising a padding (as described herein) and a carpet, and optionally a lighting device, slidably arranged within the tube.

Padding & Carpet

The padding is especially arranged to be used in combination with the carpet. The carpet is especially arranged to be at least partially transmissive, as known in the art (see for instance U.S. Pat. No. 4,754,372). Herein the term "at least partially transmissive" indicates that at least one or more parts of the carpet is (are) transmissive (i.e. especially light from one side of the carpet (such as the bottom face (see below) of the carpet) can penetrate through the carpet, and reach the opposite side of the carpet (such as the top face (see below) of the carpet).

Examples of such carpets are especially tufted carpets, having a primary backing and pile yarns forming tufts on the face of said carpet. A tufted carpet comprises in general a primary backing layer in which tufts are made, typically using nylon yarns. Subsequently a coating of an adhesive like latex is spread onto the bottom of the carpet in order to lock the tufts in place. This is called the pre-coat (latex) layer. After the pre-coat layer has dried, an additional layer of adhesive, such as latex, is applied (the so-called adhesive layer), onto which a secondary backing is applied. The carpet may then be placed in an oven (autoclave) to cure the latex. The purpose of the secondary backing is to give the carpet structure extra strength. In a preferred type of light-transmissive carpet, the adhesive is substantially light transmissive or permeable to light (see also below).

When installing carpets, often a carpet padding (underlay) is used. This is a layer of material (typical thickness between ¼ inch and ⅝ inch). The thicker the padding is, the more expensive, but also makes the carpet feel cushier. The padding is typically made of either different types of foam (called for example rebond type), or it is made of rubber, felt, or prime.

The padding has a first padding face and a second padding face, which can also be indicated as "top face" or "top layer" or "top" and "bottom face" or "bottom layer" or "bottom", respectively. The former is arranged to be directed to the carpet (carpet bottom face) and the latter is arranged opposite of the former and is in general arranged to be in contact with a floor. Terms like "below", "above", "top", and "bottom" relate to positions or arrangements of items which would be obtained when the carpet or carpet construction are arranged substantially flat on a substantially horizontal surface with the carpet bottom face of the carpet on such surface or on a surface substantially parallel to the substantially horizontal surface. However, this does not exclude the use of the carpet or carpet-padding combination in other arrangements, such as on a roll, or against a wall, or in other (vertical) arrangements, such as for instance as goblin.

With respect to the carpet, the packing density of the yarns, the color and length of the yarns, the type of secondary backing layer (if present; see also below), and the type of adhesive layer, such as between the primary backing layer and secondary backing layers (if present), can be selected to provide a carpet that allows transmission of light of a light source below the carpet, such as integrated in the padding. The transmission or light permeability can be determined by providing light at a specific wavelength with a first intensity to the material and relating the intensity of the light at that wavelength measured after transmission through the material, to the first intensity of the light provided at that specific wavelength to the material (see also E-208 and E-406 of the CRC Handbook of Chemistry and Physics, 69$^{th}$ edition, 1088-1989). The terms "permeable for light" or "light permeable" may indicate that at least about 10% of the light is transmitted, more preferably at least about 20% of the light, even more preferably at least about 30% of the light, yet even more preferably at least about 50% through the carpet, or yet even higher, such as at least about 70%.

Light transmissive carpets may be obtained in different ways. An option is to use an open (tufted) carpet structure, such as which openings. Another option is to use a (tufted) carpet comprising a primary backing layer, and an adhesive layer (and optionally a secondary backing layer), wherein the adhesive layer is transmissive for light. In comparison with carpets wherein the light sources (such as fibers) are woven into the carpet, especially the latter embodiment has the advantage that it has less size restriction of the light emitting part.

According to a further embodiment of the invention, the adhesive layer comprises latex. The latex is especially a light permeable latex. It is noted that the adhesive layer may substantially consist of latex. The latex may be based on terpolymers of styrene, butadiene and an acidic vinyl monomer. When the adhesive layer substantially consists of light permeable latex and comprise substantially no light scattering particles, the light from the light source(s) may efficiently travel through the adhesive layer. Thus, preferably no light scattering fillers are used in the adhesive and the adhesive layer is light permeable. Therefore, in an embodiment, the adhesive layer is free from light scattering particles. The phrase "is free from . . . " and similar phrase or terms especially indicate that something "is substantially free from . . . ".

According to a further embodiment of the invention, the adhesive layer comprises acrylics. The acrylics may be light permeable acrylics. It is noted that the adhesive layer may substantially consist of acrylics. An example of acrylics is polyacrylate ester. Advantages of acrylics are hardness. Acrylics are also highly resistant to heat, which makes it an especially suitable material for use in combination with LEDs, which generate a relatively large amount of heat. Latex and acrylics may also be used in combination.

In a preferred embodiment a polyolefin dispersion is used as pre-coat (on for instance the primary layer for subsequent providing the adhesive layer) and/or the adhesive layer itself. A suitable polyolefin dispersion may for instance be HYPOD™ of Dow Chemical. These are propylene- and ethylene-based dispersions that combine the performance of high-molecular-weight thermoplastics and elastomers with the application advantages of a high-solids waterborne dispersion. Polyolefin dispersions can provide benefits to carpet manufacturers by allowing them to apply a thermoplastic backing using conventional coating equipment. Example are for instance PVB (poly vinyl butyral), or polypropylene. Another suitable polyolefin dispersion may be a pvb-based dispersion. Therefore, in an embodiment, the adhesive layer preferably comprises one or more of an acrylic adhesive and a polyolefin dispersion adhesive.

The term "carpet" herein especially refers to tufted carpets, but in an embodiment also to tufted rugs and in another embodiment also to tufted goblins. In yet another embodiment, the term carpet refers to tufted car mats. Examples are also tufted carpets that are used as wall or roof covering, or tufted bath mats. Herein, the "tufted carpet" is also indicated as "carpet".

Lighting device

An advantage of the padding according to the invention is that a lighting device may be inserted in the tubes, whereby the transmissive sections allow light of the lighting device (during use thereof) escape from the tube, and also from the padding. Preferably, the lighting device is slidably arranged within the tube. In this way, especially the advantage of a padding, or carpet-padding combination, is obtained, wherein the lighting device can be removed and replaced, without substantial damage of the padding, carpet or carpet-padding combination, in a relative easy way, and in general without the need of removing the carpet from the padding and without the need of removing the entire padding of its place.

The term "slidably" herein indicates that the lighting device can be slided into the tube and can, if desired, also be slided out of the tube. This does not exclude that during use of the lighting device, the lighting device is in a substantial fixed position, with fixing means known in the art, such as clip or a fastener, etc. The phrase "during use of the lighting device" indicates the situation that the lighting device is switched on and provides light. The lighting device may comprise a light source, such as a small incandescent lamp or a fiber tip or fiber irregularity (arranged to let light escape from the fiber, which embodiment has the advantage that it is relatively cheap), but may especially comprise a LED (light emitting diode) (as light source). A specific advantage of using LEDs is that they are relatively small and may thereby fit better within the carpet padding height and/or within the tube. Hence, the lighting device comprises one or more light sources, especially a plurality of light sources (see also below), such as a plurality of LEDs.

The term LED may refer to OLEDs, but especially refers to solid state lighting. Unless indicated otherwise, the term LED herein further refers to solid state LEDs.

The lighting device may be distributed over a plurality of tubes. For instance, the padding may comprise 2-100 tubes, such as 2-50, like 4-20. Hence, the term tube may in a specific embodiment also refer to a plurality of tubes.

The term "light source" may also refer to a plurality of light sources, such as a plurality of LEDs. Hence, the lighting device may comprise a plurality of light sources. In a specific embodiment, the term "LED" may also refer to a plurality of LEDs. The term "plurality of LEDs" may refer to 2 or more LEDs, especially 2-100,000 LEDs, for instance 2-10,000, like 4-300, such as 16-256. Hence, the lighting device may comprise a plurality of LEDs. In general, the carpet may comprise 2-10,000 LEDs/$m^2$ padding, especially 25-2,500 LEDs/$m^2$ padding.

Examples of a lighting device that may be used are commercially available lighting devices that are indicated as (dimmable) rope lights, especially (dimmable) LED rope lights. Such rope lights can be used for sculpture decoration, building outlines, step lighting, handrails, displays, window and architectural highlighting, decks, patios, gazebos, boats, recreation vehicles (RVs), and more, such as in the present invention. LED rope lights can be purchased in custom pre-assembled lengths or bulk spools which can be cut to the desired length.

Tube

The tube, as integrated in the carpet, may consist of one single piece, but may also comprise a plurality of pieces. The tube may have a substantially round cross-section or may have a substantially square or substantially rectangular cross-section. Along the length of the tube, the type of cross-section may differ (see below).

The tube at least comprises one transmissive section, which may imply that the entire tube is transmissive, but it may also imply that there are one or more, such as a plurality of, transmissive sections, and one or more, such as a plurality of, non-transmissive sections.

Hence, in an embodiment, the tube further comprises a non-transmissive section, wherein preferably at least part of the non-transmissive section is reflective for light having a predetermined wavelength selected from the visible spectrum. An advantage of using transmissive and non-transmissive sections is that for the non-transmissive section cheaper and/or easier to handle materials can be used. Non-transmissive sections which are arranged in the vicinity of transmissive sections, i.e. in the vicinity of a light source, in case the lighting device is contained by the tube, may be provided with a reflector, such as a reflective coating. In this way, the orientation of the lighting device, or the light sources comprised by the lighting device, may become less critical.

In a preferred embodiment, the tube comprises a plurality of transmissive sections. In this way, a plurality of light points may be provided in the padding. A lighting device with multiple light sources may be provided in the tube, wherein the padding, tube and lighting device are arranged to be able to arrange the multiple light source to the plurality of transmissive sections.

The term transmissive is known to the person skilled in the art. It especially indicates that transmission of light having a predetermined wavelength selected from the visible spectrum is at least partially transmitted from the interior of the tube through the transmissive section to the exterior of the tube. The term "light having a predetermined wavelength selected from the visible spectrum" indicates that the light has a wavelength selected from the range of about 380-780 nm, it may also include a plurality of wavelengths or a wavelength range (at least partly within the range of the 380-780 nm) or a plurality of wavelength ranges. In general, the transmissive sections will at least be transmissive for light of lights sources that are envisaged to be arranged within the tube.

Preferably, the transmissive section is arranged to have a transmission for light having a predetermined wavelength selected from the visible spectrum in the range of about 10-100%, preferably 30-100%, more preferably a transmission in the range of about 50-100%, like for instance a transmission in the range of about 50-85%. In this way, light from the lighting device is at least partially transmitted from the interior of the tube through the transmissive section to the exterior of the tube.

The terms "blue light" or "blue emission" especially relate to light having a wavelength in the range of about 410-490 nm. The term "green light" especially relates to light having a wavelength in the range of about 500-570 nm. The term "red light" especially relates to light having a wavelength in the range of about 590-650 nm. The term "yellow light" especially relates to light having a wavelength in the range of about 560-590 nm. The term "light" herein especially relates to visible light, i.e. light having a wavelength selected from the range of about 380-780 nm.

In addition to a possible distinction between sections, it may also be possible that the tube comprises different parts. Optionally, such parts may comprise different materials and/or different shapes. For instance, there may be one or more pieces that have a round cross-section and there may be pieces that have a square or rectangular cross-section. Hence, in a specific embodiment, the tube comprises a first tube part, optionally having a substantial square or rectangular cross section, and a second tube part, optionally having a (semi-)circular cross section. An advantage of using a circular cross section, for the second tube part and square or rectangular cross sections for the first part, is that the tube may comprise different parts, where the circular tubes may be staple ware, as known in electronics, and may especially be used to bridge parts of the padding where lighting is not envisaged, whereas the first parts may be used as transmissive parts, and may for instance have such square or rectangular cross section. Further, such second part(s) may also at least partially protrude from the edge of the padding, i.e. in or on walls).

The term "(semi-)circular cross section" indicates that the cross-section can be substantially circular, but may for instance also substantially be a half circle (semi-circle). Variants in between may also be possible.

Therefore, in a preferred embodiment, the first tube part comprises the transmissive section. Advantageously, the non-light transmissive second tube part may be made of a cheaper material. More especially, the first tube part is transmissive for light having a predetermined wavelength selected from the visible spectrum. In such embodiment, substantially the entire first tube part is transmissive. Thus, in an embodiment, the second tube part comprises the non-transmissive section. Optionally, the second tube part may be reflective for light having a predetermined wavelength selected from the visible spectrum.

The first tube part comprises in a preferred embodiment one or more materials selected from the group consisting of a transmissive organic material support selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer). However, in another embodiment the first tube part comprises an inorganic material. Preferred inorganic materials are selected from the group consisting of glasses, (fused) quartz, transmissive ceramic materials, and silicones. Especially preferred are PMMA, transparent PVC, or glass as material for the first tube part. Therefore, in an embodiment, the entire first tube part consists of one or more of these transmissive materials.

Such materials may transmit light relatively well. Further, they can also be made strong enough to support people standing on it.

The entire tube part (see above) may be of such material, but in an embodiment wherein in addition to the transmissive section, the first tube part may also comprise non-transmissive sections, at least the transmissive section comprises a transmissive material as indicated above. Hence, the transmissive section comprises in a preferred embodiment one or more materials selected from the group consisting of a transmissive organic material selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer). However, in another embodiment the transmissive section comprises an inorganic material. Preferred inorganic materials are selected from the group consisting of glasses, (fused) quartz, ceramic materials (see above), and silicones. Especially preferred are PMMA, transparent PVC, or glass as material for the transmissive section.

In a specific embodiment, the second tube part comprises PVC. An advantage of this material is that it is relatively cheap. For instance, the tube may comprise a plurality of PVC parts as second tube parts and a plurality of PMMA and/or glass parts as first tube parts. The cheaper parts are used to bridge the distance between the more expensive transmissive parts.

As mentioned above, the tube is at least partially integrated in the padding. This may indicate that the tube is substantially surrounded by the padding material, but it may also indicate that part of the tube is exposed to the exterior of the padding at the first padding face (i.e. might be seen by an observer that is able to inspect the first padding face. In a preferred embodiment, at least part of the transmissive section substantially coincides with the first padding face. An advantage thereof may be that the tube is easier to install. For instance, the padding may be made with or provided with a slit or cavity, wherein the tube is arranged.

The phrases "the tube is at least partially integrated in the padding" or "the tube is integrated in the padding" indicate that the tube and the padding are an integrated device. This does not exclude that part of the tube, especially an exit piece, protrudes from the padding. In an embodiment, the padding may also comprise a plurality of paddings. For instance, in an embodiment, a padding is obtained by arranging paddings adjacent to each other with a cavity in between two paddings, wherein in the cavity the tube is arranged.

The tube may optionally be attached or fastened to the padding with means known in the art. Further, in case the tube is fully integrated in the padding, the padding may be made with or provided with a channel between the first and second face of the padding. The tube is arranged in the channel and may optionally be attached or fastened to the padding with means known in the art. Such means to attach or fasten the tube to the padding may for instance be glue, adhesives, but also Velcro, or other hook-and-loop fasteners, or other means, such as sewings, etc.

Since the carpet, and thus the padding, is in general arranged from wall to wall, it may be cumbersome to remove the lighting device from the tube. Hence, in an advantageous embodiment, the tube further comprises an exit piece at least partly protruding from the padding at a padding edge. Such exit piece can be used to reach the entrance of the tube in a relatively easy way. Preferably, such exit piece is curved. In this way, an access is created at the edge of the padding (and thus also at the edge of the carpet). Therefore, in a preferred embodiment, the invention also provides a carpet-padding combination wherein the tube further comprises an exit piece at least partly protruding from the padding at a padding edge, and wherein the exit piece is arranged to provide an access at the edge of carpet-padding combination.

In yet a further embodiment, the padding comprises a plurality of tubes. Therefore, the term "tube" may also refer to a plurality of tubes. Each tube may further comprise a plurality of transmissive sections. Advantageously, more light points and more flexibility in placing the light sources may in these ways be provided.

The padding may further comprise a controller arranged to control the lighting device. The controller may be used to address single light sources in embodiments where a plurality of light sources are comprised by the lighting device or lighting devices, and may be used to address single lighting devices, in embodiments wherein a plurality of lighting units are arranged in the tube or plurality of tubes. The controller may be used to control the color of the light provided by the lighting devices or the intensity of the light provided by the lighting device. For example, the controller may be used to control an emergency escape route lighting device. The controller may be integrated in the padding, but may also be arranged external from the padding.

As mentioned above, the invention also provides a carpet-padding combination, comprising the padding, optionally a lighting device, slidably arranged in the tube, and optionally the controller, arranged to control the lighting device.

The invention is further directed to a combination of the tube and the lighting device, for use in the padding or carpet-padding combination, wherein the lighting device is configured to be slidably arranged in the tube. In a specific embodiment, the invention further provides a combination of the tube and the lighting device, for use in the padding or carpet-padding combination, wherein the lighting device is slidably arranged in the tube.

The invention further provides a method of installing a light source below a carpet, comprising installing a padding with a tube, especially as defined herein, inserting the lighting device comprising the light source into the tube, and arranging a carpet over the padding.

The invention also provides a method for replacing a lighting device and/or a light source comprised by the lighting device in the carpet-padding combination of the invention, comprising (a) sliding the lighting device at least partly out of the tube and replacing a light source, or (b) sliding the lighting device out of the tube and replacing the lighting device.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 1a-1l schematically depict embodiments and variants thereof of the padding according to the invention;

FIGS. 2a-2b schematically depict embodiments and variants thereof of the padding according to the invention.

DESCRIPTION OF PREFERRED EMBODIMENTS

Figure 1E:
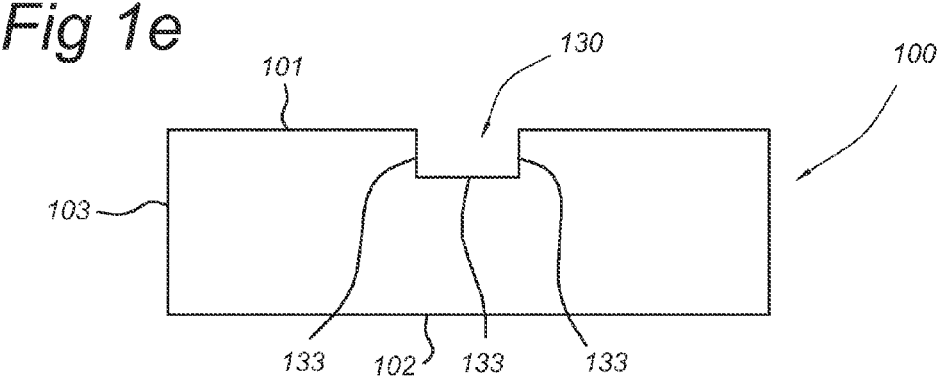

FIG. 1a schematically depicts an embodiment of a padding 100 for a carpet (not depicted, see below) according to the invention. The padding 100 comprising a first padding face 101, or padding top face (also indicated as "top face"), and a second padding face 102, or padding bottom face (also indicated as bottom face), and an edge 103. The first padding face 101 will further be indicated as top face 101; the second padding face 102 will further be indicated as bottom face 102. The padding comprises a cavity or slit 130, which hosts a tube 300 (for more detail, see also FIG. 1b below). In this way, the tube 300 may be at least partly integrated in the padding 100.

The tube 300 comprises a transmissive section 310, or more precisely: in this schematic drawing the tube 300 comprises two transmissive sections 310. The transmissive sections 310 are transmissive for light having a predetermined wavelength selected from the visible spectrum (the light of a lighting device, is not depicted; see further below). The tube 300 may further comprise a non-transmissive section 320. In the schematic drawing, the tube comprises 3 non-transmissive sections 320. Hence, in this schematically depicted embodiment, the tube 300 comprises a plurality of transmissive sections 310 and a plurality of non-transmissive sections 320.

Here, the tube 300 has a rectangular cross-section and a tube inlet or tube opening 301. The tube has a top part or top 305. Especially this top 305 part is arranged to comprise the transmissive part(s) 310. Here, at least part of the transmissive section 310 substantially coincides with the first padding face 101, i.e. the top part 305 of the tube 300 coincides with the top face 101. Herein the phrase "coincides with the top face" may especially indicate that the top face 101 is substantially flat and has a substantially constant padding thickness or height h, which may for instance be in the range of about ¼-⅝ inch.

FIG. 1b schematically depicts a cross-section of the padding 100 as schematically depicted in FIG. 1a. In this FIG., it is schematically shown that the padding 100 comprises a lighting device 400. This lighting device 400 is preferably slidably arranged within the tube 300. FIGS. 1a and 1b schematically depict tubular lighting devices 400, which have dimensions that allow sliding the lighting devices 400 into (and out of) the tube 300. Hence, the lighting device 400 especially has dimensions like width, height and diameter which are smaller than those of the tube 300. This is clear to the person skilled in the art. In FIG. 1b, the substantially flatness is indicated by the references h, which show that the height h over the padding 100 is substantially the same over the padding 100. The top of the tube 300 is at substantially the same height as the top face 101.

In further specific embodiment, not depicted, a padding 100 for a carpet 200, the padding 100 comprising a first padding face 101 and a tubular lighting device 400 integrated in the padding 100, wherein the tubular lighting device comprises a transmissive section 310, and wherein the transmissive section 310 is transmissive for light having a predetermined wavelength selected from the visible spectrum. In such device, the lighting device 400 and the tube 300 are integrated as one single piece, or in other words: the lighting device 400 is a tube 300 and is used as a tube 300. An example of such tubular lighting device is the herein mentioned rope lights (especially LED rope lights). Such tubular lighting devices 400 may be integrated in the padding 100 optionally without being slidable arranged within the padding 100. Another example of such tubular lighting device may be a fiber optic device. The fiber optic device may be used to transport light from outside the carpet padding 100 to within the carpet padding 100. Light may be coupled out of the fiber optic device using end points, or using out-coupling structures (see also above).

Returning to FIGS. 1a and especially 1b, it is shown that the cavity 130 comprises cavity edges 133, which at least partially enclose the tube 300. The tube 300 has a top part 305 and tube edge(s) 306. The top part 305 comprises the transmissive section(s) 310. The tube edge(s) 306 may be attached, for instance with glue or adhesive, to the cavity edge 133. Further, the lighting device 400 is schematically indicated.

FIG. 1c schematically depicts (in top view) an embodiment of the padding 100 wherein the lighting device 400 is arranged. The lighting device 400 is here schematically depicted to comprise two light sources 410, such as LEDs. The tube 300 comprises two transmissive sections 310 (and three non-transmissive section 320). The lighting device 400 is especially arranged in such a way, that the position of the light source(s) 410 of the light device 400 correspond to the positions of the transmissive section(s) 310, i.e. an optimal arrangement of the light source(s) 410 of the light device 400 relative to the positions of the transmissive section(s) 310. In this schematic drawing, the lighting device 400 protrudes from the tube 300 at tube opening 301. Further, schematically a controller 500 is depicted, which is electrically connected with the light source(s) 410 of the lighting device 400 (here via conductors or electrodes 411). The controller 500 may be arranged to be able to individually address the light sources 410 of the lighting device 400, and where more than one lighting devices 400 would be present (see also below), the controller 500 may be arranged to be able to individually address the light sources 410 of the lighting devices 500. The lighting device 400 may especially comprise LED(s) as light source(s) 410. An embodiment of the lighting device 400 is depicted in more detail in FIG. 1d.

The tube 300 may also be characterized by the fact that it typically has a longer length L than the light emitting part length (indicated with reference L1). This is because the tube not only serves to contain the lighting device 410, but also to transport it to a location. Thus, in a preferred embodiment, the tube 300 is substantially longer than the light emitting part of the lighting device 400. For example, the tube length L is more than 2 times as long as the light emitting part, or more preferably even 10 times longer (for example, the device 400 may comprise 10 LEDs, each giving a light spot of 1 cm, and spaced 10 cm apart. In that case the tube 300 has a length L of 100 cm and the light emitting part has a length L2 of 10 cm (more precisely, the integrate length of the light emitting parts L2 is applied to provide the total length of the light emitting parts). In another example, the lighting device 400 comprises as light source 410 one LED with a light spot of 1 cm, and the tube 300 is used to transport it 1 meter away from the tube opening 301, and thus the length of the tube 300 is 100 times the length of the light emissive part). In yet another embodiment, the tube 300 may also be characterized by the fact that it typically has an substantial equal length L (as arranged in the tube 300; an optional protruding part, as schematically depicted in FIG. 1d, is not included) as the (integrated length of the) light emitting part(s).

FIG. 1e shows, for the sake of clarity, a cross-section of the padding 100, but now without tube 300 (and lighting device 400).

Figure 1F:
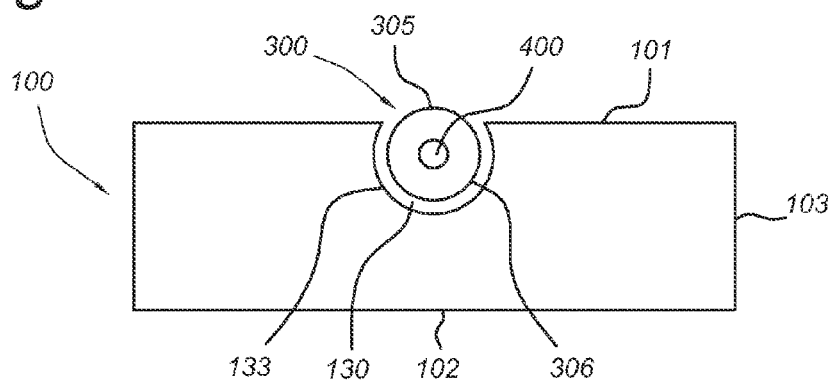

FIG. 1f schematically depicts an embodiment of the padding 100, wherein the tube 300 has a substantially circular cross-section. The cavity 130 may also have a substantially spherical shape. The lighting device 400 is by way of example also shown as a tubular device 400. In FIG. 1f, by way of example the tube 300 slightly extends beyond the top face 101. In this way, the transmissive section 310 (not indicated) may substantially coincides with the first padding face 101.

However, as will be clear to the person skilled in the art, in general the tube 300 may also be arranged to completely coincide with the top face 101 (i.e. the height h of the padding 300 is the same over the whole padding 100, including the tube 300). As will be clear to person skilled in the art, the transmissive section 310 is especially comprised in the top part 305 of the tube 300 (see also other Figs.).

Figure 1G:
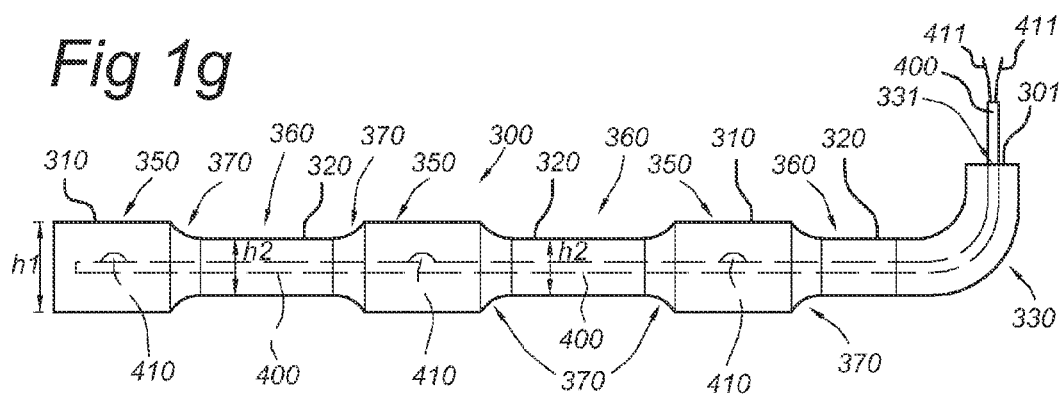
Figure 1H:
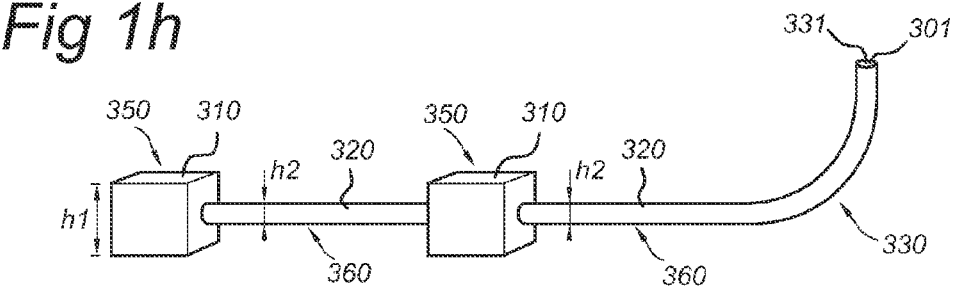

FIGS. 1g and 1h schematically depict embodiments of the tube 300 comprising different tube parts. In these Figs., the tubes 300 comprise a first tube part 350 (actually a plurality of first parts 350), which in these schematic embodiments have a substantial square or rectangular cross section, and a second tube part 360 (actually a plurality of second parts 360), which in these schematic embodiments have a substantial circular cross section. For the sake of understanding, the lighting device 400, with light sources 410, is schematically depicted in FIG. 1g.

Here, in these Figs., the first tube parts 350 comprise the transmissive sections 310. In a specific embodiment, the entire first tube parts 350 may be transmissive for light having a predetermined wavelength selected from the visible spectrum. Especially, the first tube parts 350 may comprise or consist of one or more materials selected from the group consisting of PMMA or glass. The second tube parts 360 may comprise the non-transmissive sections 320. These second tube parts 360 may comprise PVC. In this way, the distance between the light sources 410, or the transmissive sections 310, can be bridged by simple and relative inexpensive materials as tube materials, such as PVC, while only at predetermined positions, transmissive materials have to be used. In these schematic drawings 1g and 1h, the thickness (indicated with reference h1) of the first tube parts 350 and the thickness (indicated with reference h2) of the second tube parts 360 are drawn to be different, but as will be clear to the person skilled in the art, these thickness may also be substantially be equal. In both FIGS. 1g and 1h, the second tube parts 360 are drawn by way of example as tubular tube parts. Hence, in these embodiments, the thickness(es) h2 equals to the respective diameters.

FIG. 1g also schematically depicts optional connection parts 370, arranged connect the first tube parts 350 to the second tube parts 360 (and vice versa). Such connection parts 370 can be of the same material as the first tube parts 350 or the second tube parts 360. Arrangements without such intermediate connection parts 370 are of course also possible, as schematically depicted in FIG. 1h.

Especially when one or more parts of the tube 300 are transmissive, it may be advantageous if other part(s) are reflective, i.e. non-transmissive sections 320 are reflective. It may not be necessary that all non-transmissive sections 320 are reflective, but especially only those sections may be reflective which are adjacent or in the vicinity of the transmissive section 310 (see also FIGS. 1i and 1j).

Further referring to FIGS. 1g and 1h, the tube 300 further comprises an exit piece 330 which may at least partly protrudes from the padding 100, preferably at the padding edge 103 (see also FIG. 2a). Preferably, such exit piece 330 is curved. In this way, the tube opening 301 may be easily accessible for the lighting device 400, especially when the padding 100 and carpet are arranged in such a way, the exit piece 330 is arranged just above or adjacent to the carpet. For instance, when the carpet is arranged from wall to wall, the exit piece 330 may be arranged between carpet and wall. The exit piece 330 may be curved. The exit piece 330 may also be of a flexible material. It is further also referred to FIG. 2a (see below).

In an embodiment, the exit piece 330 may also be integrated in a wall (not depicted).

FIGS. 1i-1j schematically indicate embodiments, wherein the tube 300 further comprises non-transmissive section 320, wherein at least part of the non-transmissive section 320 is reflective for light having a predetermined wavelength selected from the visible spectrum. These Figs. show cross-sections of tubes 300 having a substantially square/rectangular or semi-circular cross-section. In both cases, the non-top parts of the tube 300), i.e. tube edges 306 are provided with a reflector 307. Such reflector 307 may be a reflective coating. By way of example, schematically light source 410 is depicted, providing light 412, which light source 410 is not entirely directed in the direction of the transmissive part 310. As a result of the presence of the reflector 307, a minimum of light 412 might be lost, and the light 412 that is coupled out may be maximized. Referring also to FIGS. 1g and 1h, in case the first tube parts 350 comprise the transmissive section 310 and non-transmissive sections 320, (for instance the tube edges 306 may be non-transmissive), those non-transmissive sections 320 may be provided with a reflective coating. The second tube parts 360, not comprising transmissive sections 310, do not necessarily comprises reflectors 307. The reflector(s) 307 are reflectors or reflective layer(s) arranged within the tube 300 and arranged to improve outcoupling of the light 412 of the light source(s) 410 (when the lighting device 400 is arranged within the tube and during use of the lighting device) through the transmissive section(s) 310 to the exterior of the tube 300.

The term "reflective for light having a predetermined wavelength selected from the visible spectrum" indicates that there is reflection of light 412 of the light sources. In a specific embodiment, the reflector 307 is arranged to be reflective for substantially the entire visible range. The reflector 307 may be specular reflective or diffusively reflective.

As mentioned above, the tube 300 may comprise the reflector 307, but the tube 300 may also comprise (i.e. especially within the tube 300) other or further optical components. For instance, the tube 300 may comprise i.e. especially within the tube 300) one or more optical components selected from the group consisting of reflectors 307, optical filters (not depicted), diffusers (not depicted), collimators, and lenses (not depicted). In general, the optical components (especially in the tube 300) are cooperating with the lighting device 400 to achieve a desired optical effect, such as spreading of the light, optical filtering of light, (partially) masking the light, etc. In this way, the orientation of the lighting device 400, more especially of the light source(s) 410 of the lighting device 400, within the tube 300 may be of less relevance, since the optics may compensate for less optimal orientations. Therefore, in a specific embodiment, the tube 300 at least partially encloses one or more optical components selected from the group consisting of reflectors 307, optical filters, diffusers, collimators, and lenses.

FIG. 1k schematically depicts an embodiment of the tube 300, wherein the tube 300 has tube wings 370. These tube wings 370 are extensions of the tube 300 in the plane of the padding top face 101. These wings 370 may for instance be slightly elastic (for example PMMA may be used). The aim of these wings 370 is in an embodiment to make it difficult to feel the tube 300 below the carpet (not depicted, but see below). In addition, it makes sure that the carpet is not pushed down too far by people walking over it. The wings 370 may rest on a (shallow) cutaway in the padding top face 101, but may also rest on the top face 101. Especially when the wings 370 are thin, the transmissive section 310 as well as the wings may substantially coincide with the first padding face 101.

Note that the tubes 300 herein are not necessarily one integral piece of material, as demonstrate above. In a further embodiment, the tubes 300 may consist of two or more parts. For instance, referring to especially FIGS. 1b, 1h-1k, the tube 300 may for instance substantially consist of an edge part, including the edge(s) 306, and the top part 305. For instance, one may provide the padding 100 first with the cavity 130, then provide the edge part, then optionally arrange the lighting device 400 (slidably) in the edge part, and then provide the edge part with the top part 305, optionally attaching the edge part and top part 305 together, for instance with a glue or adhesive.

FIG. 1l schematically depicts an embodiment wherein the padding 100 comprises a plurality of paddings (100', 100", ...). The padding in FIG. 1l is provided by arranging two paddings 100' and 100" adjacent to each other with a cavity 130 in between the two paddings 100' and 100", wherein in the cavity 130 the tube 300 is arranged. In this way, padding 100 is provided wherein the tube 300 is integrated. Optionally, the paddings 100' and 100", respectively, and the tube 400 may be attached to each other, with means known in the art (see also above).

FIG. 2a schematically depicts a side view of an embodiment of the padding 100 according to the invention with the tube 300 having such (flexible) exit piece 330 as already mentioned when describing FIGS. 1g and 1h. The opening 301 of the tube 300 is preferably arranged in a direction opposite to the bottom face 102 (i.e. in general in the direction of a used of the carpet). For instance, in a wall-to-wall configuration of the carpet, the exit piece 330 may be arranged between the wall and the carpet 200 (not depicted).

FIG. 2b schematically depicts a side view of an embodiment of the padding 100 according to the invention with a plurality of tubes 300, wherein the tubes 300 have a plurality of transmissive sections 310 and non-transmissive sections 320. Further, the lighting device 400 has a plurality of light sources 410. The controller 500 is in this embodiment arranged to control both lighting devices 400.

Figure 3A:
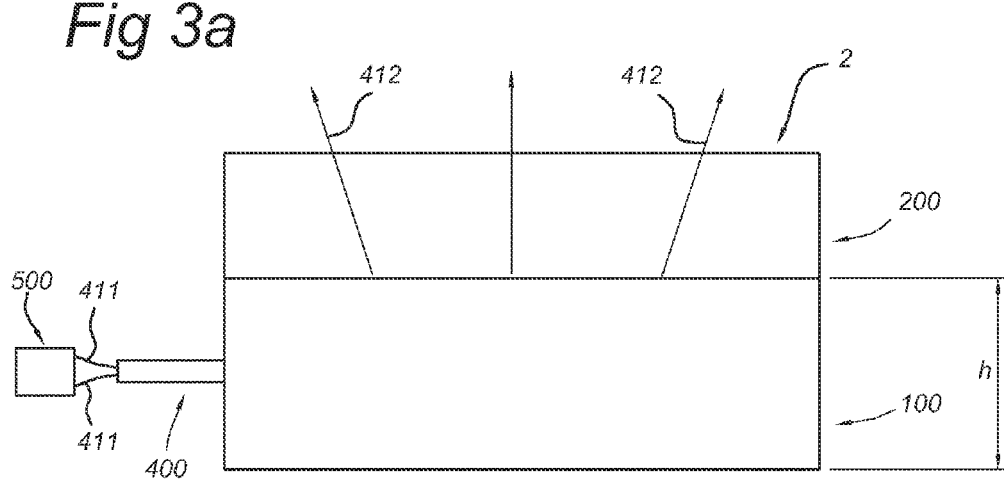
FIGS. 3a-3b schematically depicts embodiments of the carpet-padding combination according to the invention.
Figure 3B:
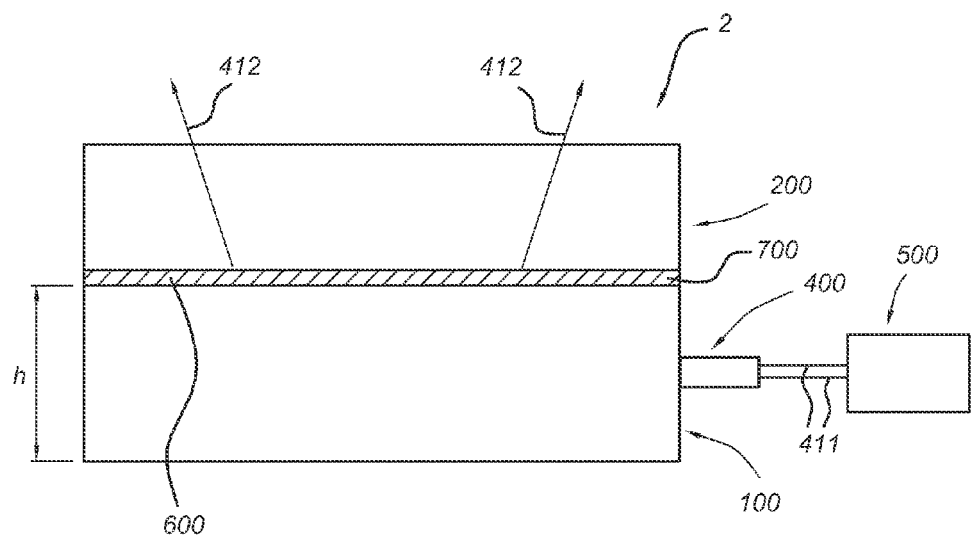

FIGS. 3a-3b schematically depict combinations of a carpet 200 and the padding 100 according to the invention, indicated herein as carpet-padding combination 2. Light 412 generated by the light sources 410 of the lighting device travels through the transmissive sections 310 (not depicted in detail; see FIGS. 1a-1l and 2a-2b), and through the carpet 200. The carpet 200 and padding 100 may be attached to each other with means know in the art, but the carpet 200 may optionally also arranged on the padding 100 without any means to attach the carpet 200 to the padding 100. An embodiment wherein an adhesive layer is applied is shown in FIG. 3b, wherein the adhesive layer is indicated with reference 700. Such adhesive layer 700 is especially arranged to be transmissive for light 412 of the light sources 410 of the lighting device 400.

As will be clear to the person skilled in the art, throughout the drawings, also combinations of the tube 300 and the lighting device 400, for use in the padding 300, wherein the lighting device 400 is preferably slidably arranged in the tube 400, are disclosed. Such combinations may be produced separately and integrated in the padding 100, or more precisely in the cavity 130 of the padding 100.

In a specific embodiment, the carpet is a tufted textile comprising:
a primary backing layer which is substantially permeable to light,
yarns forming tufts on a first side of the primary backing layer,
an adhesive layer provided on a second side of the primary backing layer opposite from the first side, and
wherein the adhesive layer is arranged so as to allow light from the light source(s) of the lighting device to reach the primary backing layer.

An element which is permeable to light refers e.g. to an element through which at least a portion of light hitting the element is allowed to transmit. The element may partly or completely be made of a translucent material, or the element may have apertures through which light can penetrate. The term "permeable to light" especially indicates that light of a specific wavelength is transmitted for at least about 10%, more preferably at least about 20%, yet even more preferably at least about 30%, yet even more preferably at least about 50%, or yet even higher, such as at least about 70%.

The yarns forming tufts of the textile may form a structure having enough openings to transmit light, even though the textile appears to be opaque to human eyes. For appearance reason, the tufts are provided in such a way that preferably the primary backing layer is not visible, but the light can still penetrate through the tuft structure. Placing a light source under a primary backing layer which is permeable to light results in that the light from the light source is emitted from the tufted surface.

Such a tufted textile has the advantage that it has less size restriction of the light emitting part.

According to a preferred embodiment of the invention, the adhesive layer is at least partially permeable to light (see also above) for allowing transmission of the light from the light source to the primary backing layer. This allows that the lighting device is arranged on the side of the carpet facing away from the primary backing layer, i.e., on the surface of the adhesive layer or of the secondary backing layer (if present).

According to a further embodiment of the invention, the tufted textile further comprises a second backing layer provided on a side of the adhesive layer facing away from the primary backing layer, wherein
the primary backing layer, the adhesive layer and the second backing layer have substantially the same surface area,
the adhesive layer is permeable to light and
the light source is arranged so as to allow light from the light source to reach the adhesive layer.

Without the second backing layer, the textile is more flexible. This may be preferable for draperies and upholstery fabrics. On the other hand, the addition of the second backing layer to the tufted textile as in this embodiment enhances the strength of the textile. This may be preferable for carpets. Compared to draperies and upholstery fabrics, carpets have the specific advantage of having more robustness and thickness, due to which the light source is better protected. An advantage of the present approach is that the lighting device is protected below the carpet. The lighting device is protected against, e.g. against abrasion or impact, which could damage e.g. the electronics or damage a water-tight seal around the electronics.

According to a further embodiment of the invention, the primary backing layer is substantially translucent. As used in this description, the term 'translucent' means that all or part of the wavelengths of the visible light is permitted to pass through the material, with or without being diffused. This has the advantage that the decrease of the intensity of the light emitted from the LEDs by the primary backing layer is reduced. For example, equal to or more than 5%, or equal to or more than 10%, or equal to or more than about 20%, or equal to or even more than 30%, even more especially at least 50% of light intensity may be transmitted.

According to a further embodiment of the invention, the primary backing layer has apertures which are covered by the tufts. In such an arrangement where the apertures are not visible to human eyes, the carpet can be used as a regular carpet when the lighting device is switched off. The apertures increase the intensity of the emitted light. The freedom of the choice of material for the primary backing layer is high, because there is no restriction that the primary backing layer material has to be translucent.

According to a further embodiment of the invention, at least one of the primary backing layer and the second backing layer comprises polypropylene, nylon or jute. These materials have the advantage that they are of relatively low cost. It is easy to manufacture a translucent structure with polypropylene or nylon. Also, the fact that these materials are commonly used in existing tufted carpets makes the carpet according to the invention easy to manufacture. It is noted that these backing layers may substantially consist of the above materials.

According to a further embodiment of the invention, the adhesive layer comprises latex. The latex may be a translucent latex. It is noted that the adhesive layer may substantially consist of latex and/or acrylics (see also above).

According to a further embodiment of the invention, at least one of the primary backing layer, the second backing layer and the adhesive layer comprises light scattering particles, which are also referred as fillers. Fillers have the advantage of reducing the cost of the carpet, while bulking up the adhesive at the same time. Because the fillers scatter light, this results in that the light from the carpet appears to originate from an area larger than the original emission spot. It is advantageous when a homogeneous light emission is desired. The light scattering particles may be calcium carbonate. The advantage of calcium carbonate is that it is of relatively low cost. Calcium carbonate may be in the form of calcite or chalk. The light scattering particles may also be kaolinite such as china clay fillers. Typically the fillers are used in quantities such as for example 600 g/l, but for many embodiments of the current invention it is preferred that much lower amounts are used in order to increase the light transmittance.

According to a further embodiment of the invention, the adhesive layer comprises electrically conductive particles. The electrically conductive particles give the carpet anti-static properties. The electrically conductive particles may be e.g. carbon black, potassium formate (HCOOK), tin-oxide, indium-tin-oxide or silver.

According to a further embodiment of the invention, the adhesive layer comprises anti-oxidants. The anti-oxidants make the adhesive layer more resistant to heat. This is advantageous because the light source (for example LEDs) can generate a substantial amount of heat. Also, latex without anti-oxidants may age faster and become yellow after some time.

According to a further embodiment of the invention the secondary backing layer has an air permeability of at least about 70 m$^3$/min/m$^2$. Air permeability of the secondary backing layer can be determined according to ASTM D-737, with a pressure differential equal to 0.5 inch (1.27 cm) water. An acceptable value is 250 ft$^3$/min/ft$^2$ (76.2 m$^3$/min/m$^2$), but more preferred values are in the range of 350-800 ft$^3$/min/ft$^2$ (106.7-243.8 m$^3$/min/m$^2$). Secondary backing layers with an air permeability of below about 70 ft$^3$/min/ft$^2$ (24.4 m$^3$/min/m$^2$) are considered to be inadequate for high binder cure rates.

According to a further embodiment of the invention, the second backing layer has apertures for air passage. Vaporized binders used for the adhesive layer can pass through the apertures during curing of the carpet. With this embodiment, it is ensured that the air permeability of the second backing layer is sufficiently high.

According to a further embodiment of the invention, the carpet has a delamination strength of at least 44.6 kg/m between the primary backing layer and the secondary backing layer. This requirement is sometimes also indicated as "peel strength" and is normally tested according to ASTM D-3936.

According to a further embodiment of the invention, the carpet further comprises a third backing layer adhered to a side of the second backing layer facing away from the adhesive layer.

According to a further embodiment of the invention, the padding further comprises a reflecting layer positioned to a side of the padding facing away from the carpet.

According to an embodiment the carpet-padding combination is used as automotive textile, covering parts of the interior of an automotive vehicle (for example floor, roof, sidelines). Automotive vehicles have the advantage that it is easy to supply the light source with power, and that the surface is often metallic, which allows effective cooling of the light source(s).

The term "substantially" herein, such as in "substantially round" or in "substantially consists", etc., will be understood by the person skilled in the art. In embodiments the adjective substantially may be removed. Where applicable, the term "substantially" may also include embodiments with "entirely", "completely", "all", etc. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". Likewise, the term about may, where applicable indicate a deviation of 10% or less, or 5% or less, or 1% or less, or 0.5% or less, or even 01.% or less, and also in an embodiment no (measureable) deviation. As will be clear to the person skilled in the art, small deviations from numerical values may, where applicable, in general be allowed. Hence, except for the values in the definition of about above, numerical values may, where applicable deviate a 10% or less, or 5% or less, or 1% or less, or 0.5% or less, or even 01.% or less from the given value. To stress this, herein sometimes the word "about" is used before numerical values.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A padding for a carpet, the padding comprising:
   a lighting device;
   a first padding face directly coupled to a bottom face of the carpet; and
   a tube at least partly integrated in the padding, wherein the tube comprises a transmissive section and an exit piece, the exit piece is at least partly protruding from the padding at a padding edge such that the lighting device is slid into and out of the tube through the exit piece, and wherein the transmissive section is transmissive for light having a predetermined wavelength selected from the visible spectrum.

2. The padding according to claim 1, wherein the lighting device (400) comprises a LED as a light source.

3. The padding according to claim 1, wherein the tube further comprises a non-transmissive section, wherein at least part of the non-transmissive section is reflective for light having a predetermined wavelength selected from the visible spectrum.

4. The padding according to claim 1, wherein the tube comprises a first tube part, wherein the first tube part includes any one of a substantial square and a rectangular cross section, and a second tube part has a semi-circular cross section.

5. The padding according to claim 4, wherein the first tube part comprises the transmissive section.

6. The padding according to claim 4, wherein the first tube part (350) is transmissive for light having a predetermined wavelength selected from the visible spectrum.

7. The padding according to claim 4, wherein the first tube part comprises one or more materials selected from the group consisting of PMMA or glass.

8. The padding according to claim 4, wherein the second tube part comprises the non-transmissive section.

9. The padding according to claim 4, wherein the second tube part comprises PVC.

10. The padding according to claim 1, wherein at least part of the transmissive section substantially coincides with the first padding face.

11. The padding according to claim 1, wherein the tube comprises a plurality of transmissive sections.

12. A carpet-padding combination, comprising a padding according to claim 1, a carpet, and a controller, arranged to control the lighting device.

* * * * *